United States Patent [19]

Dugan

[11] Patent Number: 5,224,183
[45] Date of Patent: Jun. 29, 1993

[54] MULTIPLE WAVELENGTH DIVISION MULTIPLEXING SIGNAL COMPENSATION SYSTEM AND METHOD USING SAME

[75] Inventor: John M. Dugan, Richardson, Tex.

[73] Assignee: Alcatel Network Systems, Inc., Richardson, Tex.

[21] Appl. No.: 919,426

[22] Filed: Jul. 23, 1992

[51] Int. Cl.$^5$ .............................. G02B 6/28; H04J 1/00
[52] U.S. Cl. ......................................... 385/24; 385/31; 385/27; 359/115; 359/124; 359/127; 359/161
[58] Field of Search ..................... 385/15, 16, 24, 27, 385/28, 29, 30, 31, 39, 42, 44, 123; 359/115, 124, 127, 161, 114

[56] References Cited

U.S. PATENT DOCUMENTS

| | | | |
|---|---|---|---|
| 4,261,639 | 4/1981 | Kogelnik et al. | 385/27 |
| 4,726,644 | 2/1988 | Mathis | 385/24 X |
| 4,969,710 | 11/1990 | Tick et al. | 385/141 |
| 5,035,481 | 7/1991 | Mollenauer | 385/24 X |
| 5,042,906 | 8/1991 | Chesler et al. | 385/123 |
| 5,048,909 | 9/1991 | Henry et al. | 385/27 |
| 5,093,876 | 3/1992 | Henry et al. | 385/28 |
| 5,111,519 | 5/1992 | Mathis | 385/24 |
| 5,185,827 | 2/1993 | Poole | 385/28 |

Primary Examiner—Brian Healy
Attorney, Agent, or Firm—Bruce C. Lutz; Dennis O. Kraft

[57] ABSTRACT

A method and system for multiple WDM signal compensation compensates optical chromatic dispersion for a plurality of optical signals having predetermined frequencies and each traveling in an optical path associated with the wavelength division multiplexer that forms a multiplex optical signal from the plurality of optical signals. The invention first undercompensates the multiplex optical signal by a predetermined amount so that each of the optical signals has an associated residual optical chromatic dispersion. Then, either before or after undercompensating of the multiplexed optical signal each of the optical signals is individually compensated to remove therefrom the residual chromatic dispersion. The system and method permit simultaneous and independent control of optical dispersion at any desired wavelength, as well as selection of matching compensation for optical transmitters prior to installation. The result is an increase in the usable wavelength range of optical signals for WDM networks.

10 Claims, 2 Drawing Sheets

MULTIPLE WAVELENGTH DIVISION MULTIPLEXING SIGNAL COMPENSATION SYSTEM AND METHOD USING SAME

TECHNICAL FIELD OF THE INVENTION

The present invention relates to electronics and more particularly to fiber optic communications systems. Even more particularly, the present invention relates to a method and system to increase the usable wavelength range of a wavelength division multiplexed optical path by achieving zero chromatic dispersion near desired wavelengths of operation.

BACKGROUND OF THE INVENTION

In optical fiber networks, wavelength division multiplexing (WDM) uses a device known as a wavelength division multiplexer to multiplex individual optical signals into a single multiplexed signal that a single optical fiber can carry. WDM is generally used when the number of fibers in an existing transmission link is inadequate or designing a system with a sufficient number of fibers becomes cost prohibitive.

WDM systems often operate at frequencies other than the frequency for which an existing transmission link may best operate. For example, some WDM systems may operate at optical frequencies of between 1540 and 1550 nm, while the existing transmission link may be designed to array a signal having a 1310 nm wavelength. For these instances, undesirable optical chromatic dispersion may occur in the optical path. The optical fiber path for a WDM system, therefore, may require chromatic dispersion compensation to achieve desired performance characteristics.

Optical fiber compensation is usually selected to reduce the chromatic dispersion to zero at a wavelength near the planned wavelength of operation. This wavelength is called the dispersion-zero or zero-chromatic-dispersion wavelength. In some types of dispersion compensation, both positive and negative residual chromatic dispersion, may persist at wavelengths other than the dispersion-zero wavelength. This remaining chromatic dispersion may limit the usefulness of the optical fiber transmission path, because the non-zero dispersion may compromise or preclude transmission of optical signals having frequencies other than the dispersion-zero frequency.

C. Lin, H. Kogelnik, and L. G. Cullen, "Optical-Pulse Equalization of Low-Dispersion Transmission in Single-Mode Fibers in the 1.3–1.7 μm Spectra Region," *Optics Letters*, v.5, No. 11 (Nov. 1980), describes an optical-pulse-equalization technique for minimizing pulse dispersion in a single-mode fiber transmission system. The technique uses the positive and the negative dispersion characteristics of single-mode fibers on both sides of a dispersion-zero wavelength. While the technique is successful in controlling chromatic dispersion for a single wavelength, it does not address the problem of providing compensation over a band of wavelengths.

It is therefore an object of the present invention to provide a method and system to simultaneously and independently control chromatic dispersion of independent optical signals that are to be wavelength division multiplexed for transmission.

It is an object of the present invention to provide a system that permits simultaneous and independent control of optical dispersion at any desired wavelength to increase the usable wavelength range of optical signals for wavelength division multiplexing. To achieve these results, the present invention individually compensates optical dispersion of all signals associated with a wavelength division multiplexer. This is in addition to the dispersion compensation that the multiplexed signal itself experiences. The method and system undercompensates the multiplexed optical signal by a predetermined amount so that each of the optical signals has an associated residual optical dispersion. To eliminate the residual optical dispersion, each of the optical signals is compensated individually to produce a zero optical dispersion along each individual optical path that will receive the demultiplexed optical signals. Consequently, each of the optical signals that make up the multiplexed optical signal has minimal chromatic dispersion upon receipt.

It is also an object of the present invention to permit modular interchanging or replacement of different optical signal transmitters while maintaining the same performance along the wavelength division multiplexed signal path. By selecting individual compensation to match the precise wavelength of the individual transmitter and, then, including the individual residual dispersion compensation as a modular part of the optical signal transmitter itself, the present invention permits non-disruptive interchanging or replacement of dispersion compensated transmitters.

BRIEF DESCRIPTION OF THE DRAWINGS

The invention and its modes of use and advantages are best understood by reference to the following description of the illustrative embodiment when read in conjunction with the accompanying drawings, wherein.

DETAILED DESCRIPTION OF THE INVENTION

The preferred embodiment of the present invention is best understood by referring to the figures wherein like numerals are used for like and corresponding parts of the various drawings.

The method and system of the preferred embodiment increase the useable wavelength range of a wavelength division multiplexed signal by essentially eliminating residual dispersion in the individual optical paths that form a wavelength division multiplexed signal. The present invention takes advantage of the fact that in WDM systems, the wavelength of each optical transmitter feeding into a wavelength division multiplexer is known, as are the dispersion characteristics for frequencies above and below a predetermined dispersion-zero wavelength. With this information, it is possible to individually compensate the individual optical signals either prior to multiplexing or after demultiplexing the signal. For example, when compensating a standard 1310 nm optimized single-mode fiber to operate in the 1550 wavelength window, the fiber may be undercompensated as a whole. Then, either prior to multiplexing or after demultiplexing, additional compensation may be added for each wavelength signal feeding into the WDM. The result is that each signal that the WDM system carries will be operating at a near zero dispersion level for its individual optical signal wavelength.

Figure 1:
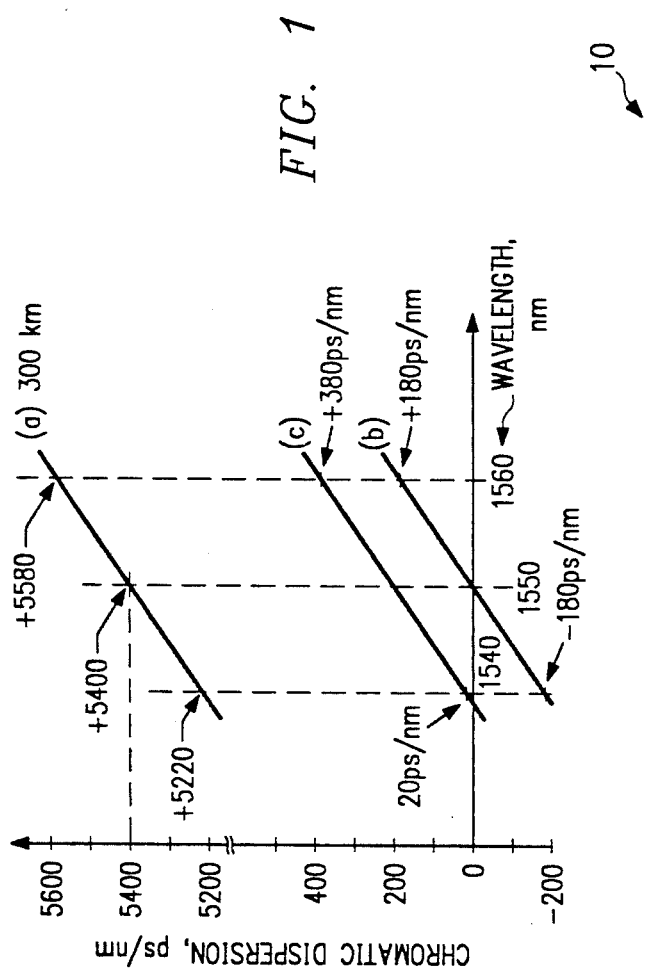
FIG. 1 provides a plot of chromatic dispersion versus wavelength to illustrate the effects of compensating dispersion in a wavelength division multiplexed signal.

Referring to FIG. 1, there is shown a particular example of the effects of dispersion compensating a WDM output signal as well as the effects of this dispersion at wavelengths other than the dispersion zero wavelength. Along the ordinate of the graph of FIG. 1 is an abbreviated plot of chromatic dispersion in ps/nm ranging from −200 to 5600 ps/nm. Along the abscissa of FIG. 1 appears an abbreviated range axis for optical signal wavelengths in nm ranging from zero to 1560 nm. Within the plot of FIG. 1 appear three lines of approximately equal slope for an exemplary 300 km fiber span of standard 1310 nm optimized fiber. Curve (a) of FIG. 1 shows the uncompensated chromatic dispersion versus wavelength curve ranging from 5220 ps/nm at a wavelength of 1540 nm through a point of 5400 ps/nm at 1550 nm to a outer point, for example, of 5580 ps/nm at a 1560 nm wavelength. An equation for curve (a) may be stated as follows:

$$\text{Dispersion} = 18 \cdot (\text{wavelength} - 1250 \text{ nm}) \text{ [ps/nm]} \quad (1)$$

Suppose further that in order to compensate for optical dispersion at the wavelength of 1550 nm, a −5400 ps/nm dispersion compensator compensates the output of a WDM. In such an instance, 1550 nm is the dispersion zero wavelength. This causes the values of equation (1) to shift according to the following formula:

$$\text{Dispersion} = 18 \cdot (\text{wavelength} - 1550 \text{ nm}) \text{ [ps/nm]} \quad (2)$$

Curve (b) shows a plot of equation (2). Note that at wavelengths other than the 1550 nm dispersion-zero wavelength chromatic dispersion affects the optical signal. Chromatic dispersion is negative for wavelengths less than 1550, (e.g., −180 ps/nm chromatic dispersion at 1540 nm) and positive for wavelengths greater than 1550 nm (e.g., +180 ps/nm at a wavelength of 1560 nm). The residual dispersion that occurs at other than the dispersion-zero wavelength of the multiplexed signal, therefore, adversely affects and limits the use of an optical fiber path for carrying a WDM output signal. In fact, for those signals above and below the dispersion-zero wavelength, several important optical signals may be compromised or even fully precluded.

The method and system of the preferred embodiment overcome this problem by providing a combination of undercompensation that yields at least a small positive amount of residual chromatic dispersion at the shortest wavelength that may travel along a standard fiber as a WDM output. For example, curve (c) of FIG. 1 shows that at the lowest wavelength of the example (i.e., 1540 nm) yet a small degree of undercompensation (i.e., 20 ps/nm) remains as residual chromatic dispersion when the previous dispersion-zero wavelength of 1550 nm is compensated only by −5200 ps/nm. From this point, chromatic dispersion will increase as the wavelength increases to, for example, a wavelength of 1560 nm to reach a residual chromatic dispersion value of +380 ps/nm.

The preferred embodiment provides −5400 ps/nm as was used in curve (b), but rather only −5200 ps/nm to yield a +200 ps/nm chromatic dispersion at the 1550 nm wavelength. With this degree of undercompensation, the preferred method and system then individually compensate for the residual dispersion associated with each of the wavelengths associated with WDM.

Figure 2:
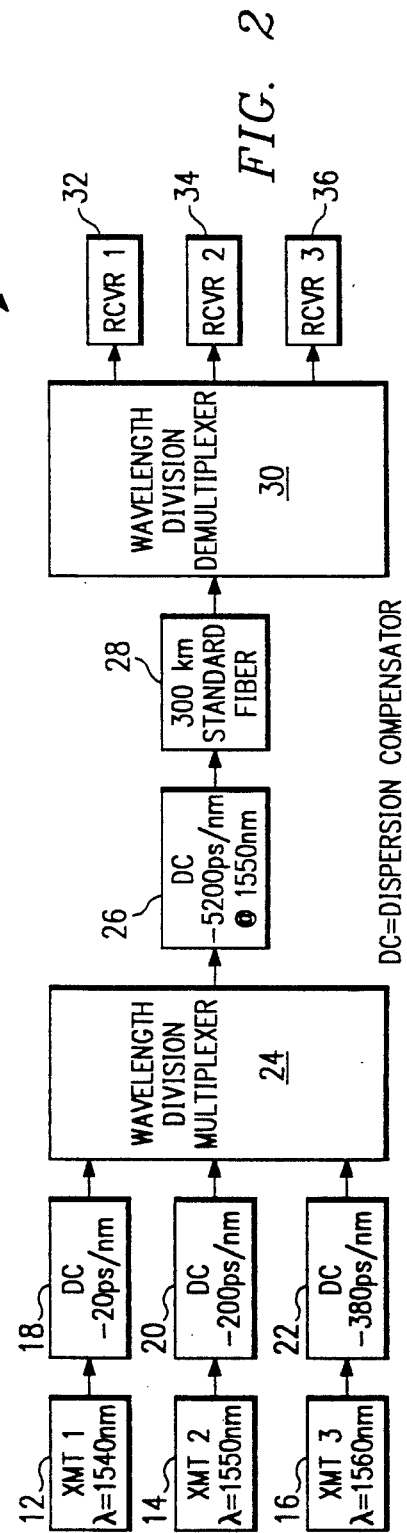
FIG. 2 provides a simplified block diagram of the preferred embodiment of the present invention.

FIG. 2 specifically shows the preferred embodiment to more fully illustrate the inventive concept. Referring to FIG. 2, there is shown a WDM optical transmission system 10 that includes, for example, three optical transmitters such as XMT1 designated as 12 for transmitting a signal having a wavelength $\lambda$ equal to 1540 nm, XMT2 designated as 14 for transmitting a wavelength of 1550 nm, and XMT3 designated as 16 for transmitting a wavelength of 1560 nm. Each of the optical signal transmitters feed to residual dispersion compensators. For example, dispersion comparator 18 receives output from XMT1 12, dispersion compensator 20 receives signals from XMT2 14, and dispersion compensator 22 receives optical signals from optical transmitter XMT3 16. Outputs from dispersion compensators 18, 20 and 22 go to WDM 24. WDM 24 provides a single output signal that goes to dispersion compensator 26 for compensating the WDM 24 multiplexed signal. From the dispersion compensator 26, the multiplexed optical signal travels along, for example, 300 km standard fiber 28 that ultimately goes to wavelength division demultiplexer 30. After demultiplexing the optical signal it receives, wavelength division demultiplexer 30 transmits the individual optical signals to individual receivers designated as RCVR1 having reference numeral 32, RCVR2 designated by reference numeral 34 and RCVR3 designated by reference numeral 36.

The system of FIG. 2 takes into consideration the known operating characteristics of a system having a dispersion-zero wavelength of 1550 nm and a positive or increasing rate of chromatic dispersion versus wavelength. In the example of FIG. 2, instead of providing a −5400 ps/nm dispersion compensator (as is the case of curve (b) of FIG. 1), the method and system of the preferred embodiment provide only a −5200 ps/nm dispersion compensator. The result is that at the dispersion-zero wavelength of 1550 nm, a residual dispersion of 200 ps/nm exists. Also, at the 1540 nm wavelength, a positive chromatic dispersion of ps/nm occurs of +20 ps/nm. This contrasts with the −180 ps/nm chromatic dispersion that would exist if a −5400 ps/nm dispersion compensator were used as dispersion compensator 26 of FIG. 2. Similarly, in curve (c) of FIG. 1, instead of a +180 ps/nm chromatic dispersion at a 1560 nm wavelength, a +380 ps/nm optical dispersion occurs.

To compensate for these positive chromatic dispersion values existing when using only a −5200 ps/nm dispersion compensator 26, the preferred embodiment uses the discrete residual chromatic dispersion compensators 18, 20 and 22 of FIG. 2. In particular, dispersion compensator 18 provides −20 ps/nm of optical dispersion for the 1540 nm optical signal from XMT1 12. Dispersion compensator 20 provides −200 ps/nm of residual chromatic dispersion compensation for the optical signal from XMT2 14. Dispersion compensator 22 provides −380 ps/nm for the 1560 nm optical signal from XMT3 16. This preliminary chromatic dispersion compensation assures that all the signals reaching WDM 24 have a chromatic dispersion of +5200 ps/nm. Then, at dispersion compensator 26, the multiplexed output from WDM 24 is compensated by an amount of −5200 ps/nm so that each of the signals comprising multiplexed signal output from WDM 24 operates at a near zero optical dispersion upon being transmitted along 300 km standard fiber 28. Then, at wavelength division demultiplexer 30, the compensated multiplexed signal is then demultiplexed and sent to receivers RCVR1 32, RCVR2 34, and RCVR3 36.

The method and system of the preferred embodiment have several important advantages. For example, by first undercompensating all of the optical signals from the optical transmitters, there exists the residual chromatic dispersion that can be eliminated to produce uniform chromatic dispersion level. Additionally, by individually compensating residual chromatic dispersion in each optical path, the simultaneous and independent control of optical dispersion is possible for any desired wavelength. This permits matching compensation to an optical transmitter prior to installing the transmitter in a WDM system. In fact, by permitting the selection of matching compensation prior to connecting an optical source to a WDM system, the preferred method and system permit packaging the residual dispersion compensation with a transmitter. This may be done during transmitter manufacture to ensure that residual dispersion compensation is as precise as possible.

Figure 3:
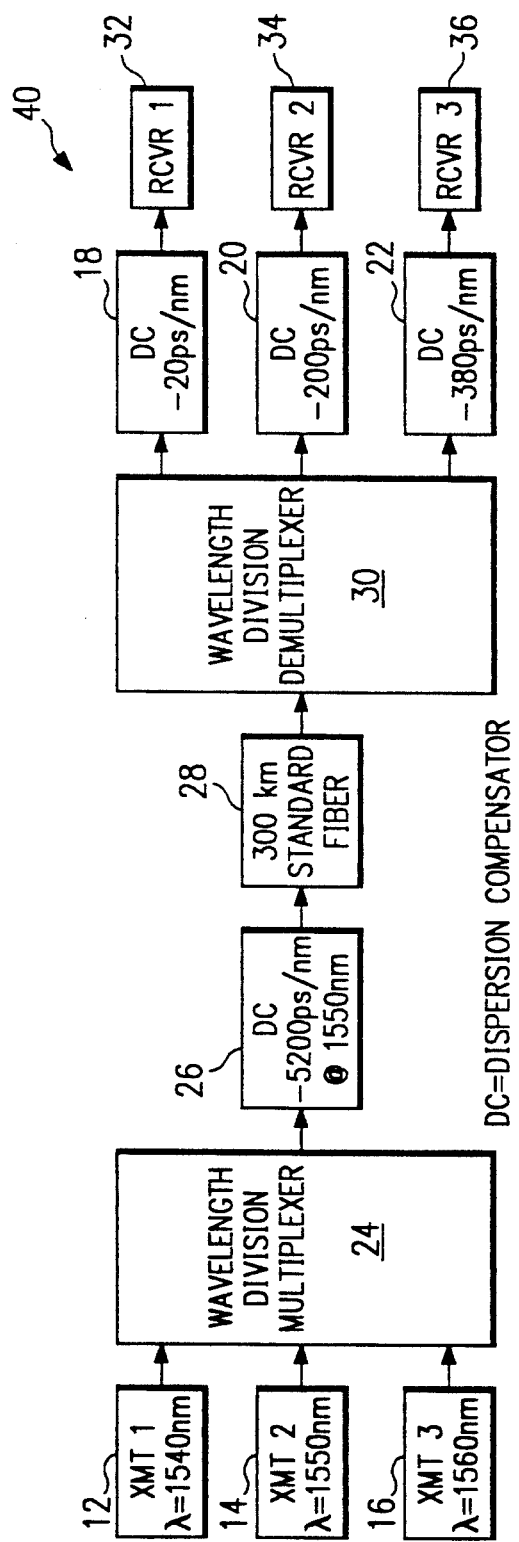
FIG. 3 provides an alternative embodiment of the present invention.

FIG. 3 shows an alternative embodiment 40 of the present invention. In particular, optical transmitters XMT1 12, XMT2 14, and XMT3 16 all feed directly to WDM 24. Output from WDM 24 goes to −5200 ps/nm dispersion compensator 26 and then to 300 km standard fiber 28. At the receiving end, the multiplexed signal from 300 km standard fiber 28 goes to wavelength division demultiplexer 30 for demultiplexing. Then, in contrast to the preferred embodiment, each of the demultiplexed optical signals go to respective dispersion compensators 18, 20 and 22. Dispersion compensator 18 provides −20 ps/nm dispersion compensation for the demultiplexed 1540 nm optical signal, dispersion compensator 20 provides −200 ps/nm compensation for the demultiplexed 1550 nm optical signal, and dispersion compensator 22 provides −380 ps/nm dispersion compensation for the demultiplexed 1560 nm optical signal. Receiver RCVR1 32 receives the compensated output from dispersion compensator 18, RCVR2 34 receives the compensated output from dispersion compensator 20, and RCVR3 36 receives the compensated output from dispersion compensator 22.

In essence, a distinction between the preferred embodiment of FIG. 2 and the alternative embodiment of FIG. 3 is that instead of compensating for local residual optical dispersion prior to wavelength division multiplexing at WDM 24, the alternative embodiment compensates for local residual dispersion at the output of wavelength division demultiplexer 30. In such an instance, for example, each receiver 32, 34 and 36 may include prepackaged residual dispersion compensators such as dispersion compensators 18, 20, 22, respectively, that may be installed during receiver manufacture. Finally, a combination of local residual dispersion compensation both before receipt of the optical signal at WDM 24 and after demultiplexing at wavelength division demultiplexer 30 may be attractive for some applications.

OPERATION

Although, given the above description of FIGS. 2 and 3, it may be intuitive how the preferred multiple WDM signal system compensation network 10 of the preferred embodiment operates to individually compensate for residual dispersion, the following discussion describes the system as a whole by following an exemplary signal flow from transmission to receipt. For example, referring again to FIG. 2, suppose that three signals, one having a wavelength of 1540 nm, another having a wavelength of 1550 nm, and yet a third of having a wavelength 1560 nm are to be transmitted along a 300 km standard 1310 nm optimized fiber.

To transmit these signals, XMT1 12 sends the 1540 nm signal to −20 ps/nm dispersion compensator 18, XMT2 14 sends the 1550 nm signal to −200 ps/nm dispersion compensator 20, and XMT3 16 sends the 1560 nm signal to −380 ps/nm dispersion compensator 22. Each of these signals simultaneous and independently go to WDM 24 where they are multiplexed into a single multiplexed WDM output signal. This WDM output signal is then sent directly to −5200 ps/nm dispersion compensator 26 which provides −5200 ps/nm of chromatic dispersion compensation.

The output of the −5200 ps/nm dispersion compensator 26 has approximately zero chromatic dispersion after it exits the 300 km standard 1310 nm optimized fiber 28. This multiplexed signal then goes to wavelength division demultiplexer 30, where it is demultiplexed into three signals having respective wavelengths of 1540 nm, 1550 nm, and 1560 nm. Each of the optical signals have an approximately zero chromatic dispersion and go to associated receivers RCVR1 32, RCVR2 34 and RCVR3 36.

The operation of the alternative multiple WDM signal compensation network 40 at FIG. 3, again, is similar to that of FIG. 2, except that local residual chromatic dispersion compensation does not take place until after the signal is demultiplexed by wavelength division demultiplexer 30.

In summary, the preferred method and system provide a multiple WDM signal compensation network that eliminates residual dispersion compensation and overcomes limitations associated with single dispersion compensation networks by undercompensating the multiplexed optical signal by a predetermined amount so that each of the optical signals that feed into a WDM has an associated residual optical dispersion and, then, either before or after multiplexing takes place, compensating individually each of the optical signals to remove the residual optical dispersion. This avoids the problems that residual chromatic dispersion can induce that may make certain signals in a WDM multiplexed signal unacceptable for high data rate operations.

Although the invention has been described with reference to the above-specified embodiments, this description is not meant to be construed in a limiting sense. Various modifications of the disclosed embodiment, as well as alternative embodiments of the invention, will become apparent to persons skilled in the art upon reference to the above description. It is, therefore, contemplated that the appended claims will cover such modifications that fall within the true scope of the invention.

What is claimed is:

1. A method for compensating optical chromatic dispersion of a plurality of optical signals associated with a wavelength division multiplexer that forms a multiplexed optical signal from said plurality of optical signals, comprising the steps of:

undercompensating said multiplexed optical signal by a predetermined amount so that each of said optical signals has an associated residual optical dispersion; and compensating individually each of said optical signals to remove therefrom said residual optical dispersion.

2. A method for increasing the useable wavelength range of an optical fiber path, comprising the steps of:

forming a multiplexed optical signal for transmission along said optical path from a plurality of optical signals;

undercompensating said multiplexed optical signal by a predetermined amount so that each of said optical signals has an associated positive residual optical dispersion when transmitted along said optical path; and compensating individually each of said optical signals to remove therefrom said residual optical dispersion to thereby permit transmission along said optical path with minimal optical dispersion for each of said optical signals.

3. A method for discretely compensating a plurality of optical signals associated with a wavelength division multiplexer, comprising the steps of:

associating a plurality of optical signals with a wavelength division multiplexer to form a multiplexed optical signal;

undercompensating said multiplexed optical signal by a predetermined amount so that each of said optical signals has an associated residual optical dispersion; and compensating individually each of said optical signals by a predetermined discrete amount to remove therefrom said residual optical dispersion.

4. A method for approximating a dispersion-zero wavelength in a plurality of optical paths, comprising the steps of:

associating a wavelength division multiplexer with said plurality of optical paths each carrying an optical signal from an associated optical signal transmitter;

generating a multiplexed optical signal from said wavelength division multiplexer;

undercompensating said multiplexed optical signal by a predetermined amount so that each of said optical signals has an associated residual optical dispersion; and compensating individually each of said optical signals to remove therefrom said residual optical dispersion, thereby causing each of said optical signals to be transmitted at approximately a dispersion-zero wavelength for each of said optical paths.

5. A method of matching dispersion compensation to an optical wavelength, comprising the steps of:

generating said plurality of optical signals to each have a predetermined signal wavelength and an associated predetermined level of chromatic dispersion;

multiplexing said optical signals using a wavelength division multiplexer to produce a single multiplexed optical signal;

undercompensating said multiplexed optical signal by a predetermined amount so that each of said optical signals within said multiplexed optical signal has an associated residual optical dispersion; and compensating individually each of said optical signals to remove therefrom said residual optical dispersion.

6. A system for compensating optical dispersion of a plurality of optical signals, comprising:

a plurality of optical signal transmitters for transmitting a plurality of optical signals;

a wavelength division multiplexer for generating a multiplexed optical signal from said plurality of optical signals;

a first dispersion compensating means for undercompensating said multiplexed optical signal by a predetermined amount so that each of said optical signals has an associated residual optical dispersion; and a plurality of second dispersion compensating means for compensating individually each of said optical signals to remove therefrom said residual optical dispersion.

7. A system to increase the useable wavelength range of an optical fiber path, comprising:

a plurality of optical transmitters for transmitting a plurality of optical signals;

wavelength division multiplexing means for multiplexing said optical signals to form a multiplexed optical signal;

undercompensating means for undercompensating said multiplexed optical signal by a predetermined amount so that each of said optical signals associated with said multiplexed optical signal has an associated residual optical dispersion; and residual compensating means for compensating individually each of said optical signals to remove therefrom said residual optical dispersion.

8. A system for individually compensating a plurality of optical signal paths prior to multiplexing said optical signals, comprising:

optical signal transmitting means for transmitting a plurality of optical signal;

individual compensating means for compensating individually each of said optical signals to remove therefrom a predetermined amount of optical chromatic dispersion;

a wavelength division multiplexer for producing a multiplexed optical signal from said plurality of optical signals; and multiplexed signal compensating means for compensating said multiplexed optical signal by a predetermined amount so that each of said optical signals has a near zero optical dispersion as a result of combining compensation from said multiplexed signal compensating means and said individual compensating means.

9. An optical chromatic dispersion system for simultaneously and independently compensating a plurality of optical signals associated with a wavelength division multiplexer, comprising:

a plurality of optical signal transmitters for transmitting optical signals each having predetermined frequency;

wavelength division multiplexer means for multiplexing a predetermined aspect of said optical signals to generate a multiplexed optical signal;

undercompensating means for undercompensating a said multiplexed optical signal by a predetermined amount so that each of said optical signals has an associated residual optical dispersion; and compensating means for compensating individually each of said optical signals to remove therefrom said residual optical dispersion.

10. A system for matching dispersion compensation to an optical wavelength for a plurality of optical signals that form a multiplexed optical signal, comprising:

a plurality of optical signal transmitters for transmitting said plurality of optical signals, each of said plurality of optical signals having a predetermined residual chromatic dispersion;

wavelength division multiplexing means for multiplexing a predetermined aspect of said optical signals to generate a multiplexed optical signal;

undercompensating means for undercompensating said multiplexed optical signal by a predetermined amount to form of said residual optical dispersion for each of said optical signals; and matching compensating means for compensating individually each of said optical signals to remove therefrom said residual optical dispersion.

* * * * *